June 11, 1963    P. J. ALLEN    3,093,825
POLARIMETER
Filed Feb. 26, 1959    2 Sheets-Sheet 1

INVENTOR
PHILIP J. ALLEN

BY *Richard C. Reed* ATTORNEY

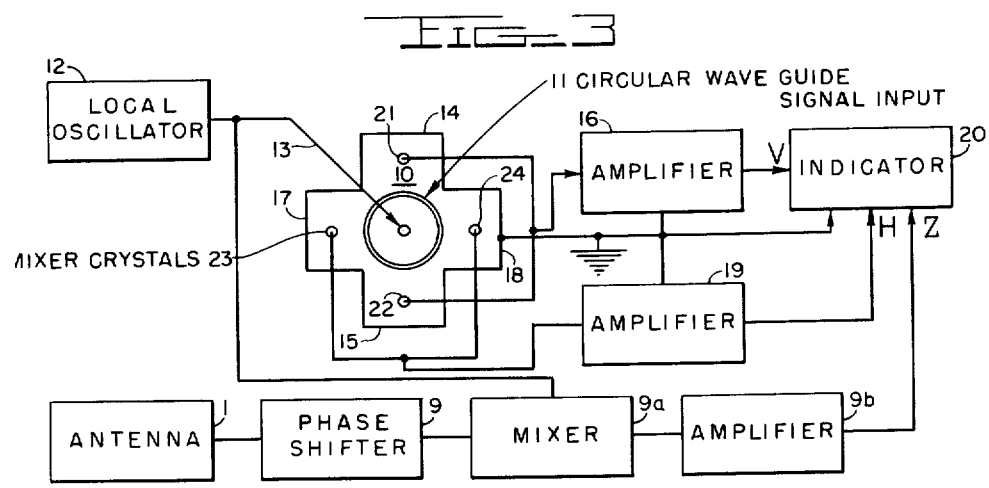
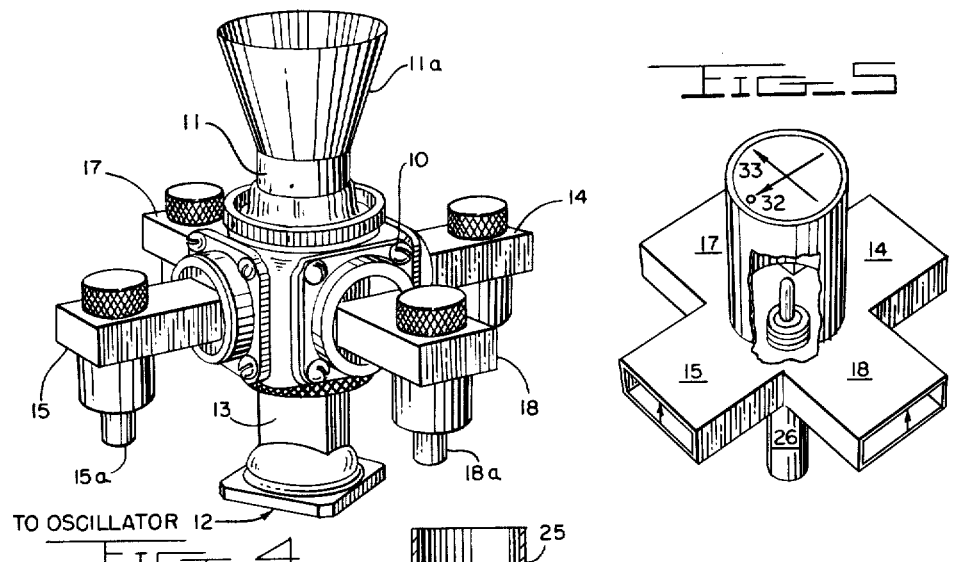

United States Patent Office 3,093,825
Patented June 11, 1963

3,093,825
POLARIMETER
Philip J. Allen, 8000 Marion St., North Forestville, Md.
Filed Feb. 26, 1959, Ser. No. 795,876
3 Claims. (Cl. 343—100)
(Granted under Title 35, U.S. Code (1952), sec. 266)

The invention described herein may be manufactured and used by or for the Government of the United States of America for governmental purposes without the payment of any royalties thereon or therefor.

This invention relates to measurement instruments in general and in particular to a microwave polarimeter the purpose of which is to produce an indication perceptible by the senses of man of the polarization of an incoming electromagnetic wave.

Virtually any form of electromagnetic energy device which is coupled to space is capable of providing an energy field which has specific polarization characteristics as determined by the specific radiator element involved in the coupling to space. It is characteristic of the normal space coupling that it will intercept energy existing with a selected polarization and will not respond equally to energy having other forms or planes of polarization. For example a device which will intercept horizontally polarized energy is normally substantially unresponsive to vertically polarized energy. Thus a knowledge of the polarization characteristics of an electromagnetic wave is essential in many fields concerned with either guided or free space propagation of radio energy. In investigations such as the study of radar target echo characteristics, for example, detailed knowledge of the polarization characteristics of the return signal is required. At microwave frequencies the usual method of measuring polarization has been to employ a rotating linearly polarized analyzer which periodically samples the signal amplitude at various polarizations. However, this method has two important deficiencies since relative phase information is not obtained, and amplitude information is collected on a sequential basis. For many applications complete instantaneous indication of polarization phase and amplitude is required. Another form of prior art device which is an improvement over the method outlined above simultaneously compares the amplitudes of two orthogonal linearly or circularly polarized components, but unless the relative phase between these two components also is obtained, the polarization information is incomplete. The prior art microwave circuitry required to obtain instantaneous phase information as well as the amplitude data is complex, usually narrow band, and of only moderate accuracy.

It is accordingly an object of the present invention to provide a polarimeter which utilizes both phase and amplitude information to provide an accurate instantaneous presentation of input signal polarization characteristics.

Another object of the present invention is to provide a polarimeter which does not require complicated circuitry.

Other objects and many of the attendant advantages of this invention will be readily appreciated as the same becomes better understood by reference to the following detailed description when considered in connection with the accompanying drawings wherein:

FIG. 3 is a schematic diagram of apparatus embodying the features of the present invention in a form having particular advantages at microwave frequencies.

FIGS. 4, 5 and 6 show various features of the trimode turnstile junction and associated components employed in the present invention.

There are a number of ways of completely specifying the polarization characteristics of an electromagnetic wave. For example, a wave having an arbitrarily selected or a fortuitous polarization which may be subject to rapid variation can be described in terms of instantaneous orthogonal X and Y components which are located in a reference plane which is normal to the direction of propagation. Hence the measurement of polarization of such a wave amounts to establishing the parameters (amplitude and phase) of the above components either by direct measurement or by computation from other measurements. Of the techniques generally used for measuring polarization, most involve time-sequential measurement of some parameters. This is particularly true at microwave frequencies where sequential measuring techniques are relatively simple, but where prior art simultaneous measuring techniques require rather complex "plumbing" consequently limiting bandwidth and accuracy.

In accordance with the teaching of the present invention, apparatus is employed to separately and simultaneously derive two signals in dependency on the components of a received signal in orthogonal planes of polarization and to compare them by simultaneous indication on a two dimensional indicator device wherein the amplitude of each signal is indicated in one of the dimensions. The basic apparatus is usable at frequencies where a polarization sensitive antenna can be readily constructed and is particularly well suited to operation at microwave frequencies when polarization devices can be constructed in small physical size.

Figure 1:
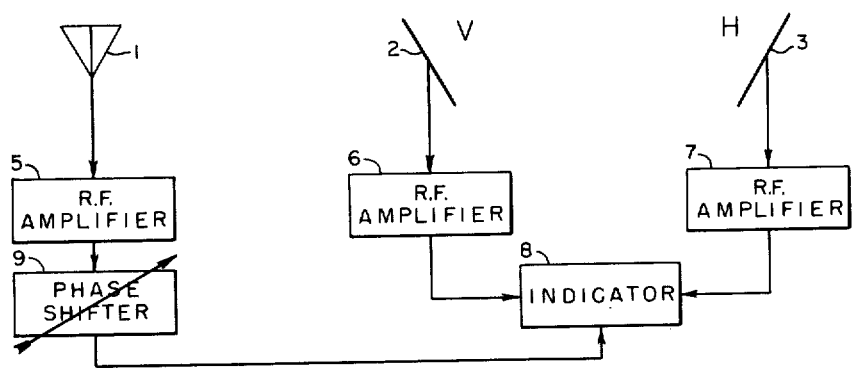
FIG. 1 is a schematic diagram of apparatus embodying the features of the present invention.
Figure 2:
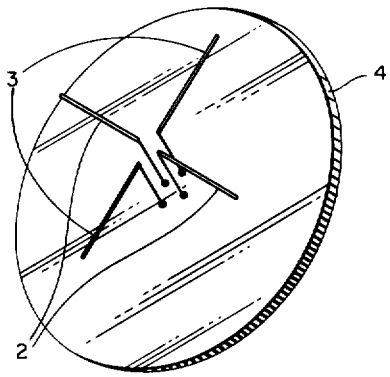
FIG. 2 shows a typical polarization sensitive antenna arrangement suitable for use in connection with FIG. 1.

With reference now to FIG. 1 of the drawing, the apparatus indicated therein indicates some of the broader aspects of the invention in simplified form possible at certain frequencies, such as 20 megacycles per second. At this frequency, polarization sensitive antennas such as the center-fed half wave dipole are not of prohibitive physical dimensions and yet these frequencies are sufficiently low to be amplified directly without frequency conversion and indicated by conventional means such as a cathode ray tube indicator. Thus the apparatus of FIG. 1 includes three antennas 1, 2, 3, antenna 1 being substantially insensitive to polarization, antennas 2 and 3 being sensitive to signals polarized in two planes oriented at 90 degrees relative to each other. FIG. 2 shows more details of the arrangements of antennas 2 and 3, these elements being indicated as crossed dipoles, center fed, and backed by a suitable ground plane 4.

Signals intercepted by the antenas 1, 2 and 3 are separately amplified in amplifiers 5, 6, 7, amplifiers 6 and 7 being preferably selected to have comparable characteristics as to phase shift and amplification. The outputs of amplifiers 6 and 7 are applied to the separate horizontal and vertical axes of a cathode ray tube indicator 8, which are related by 90 degrees as were the polarization sensitive antennas 2 and 3.

The result of the foregoing combination of components of FIG. 1 is the production of a cathode ray tube indication which corresponds to the type of polarization of a signal incident upon the antennas 2 and 3. Thus a horizontally polarized signal will affect only one antenna 2 or 3 to produce a horizontal linear signal on indicator 8, and likewise a vertically polarized signal will affect only the other antenna 2 or 3 to produce a vertical linear signal on indicator 8. Intermediate angularities of polarization will affect both antennas in intermediate amplitudes and different phasing to produce linear signals inclined at acute angles relative to the H and V axes. Additionally, elliptically polarized signals will produce elliptical indications. Such eliptical as well as the special case of circular polarization have either right or left hand sense of circularity of polarization, such being resolved by the circuitry of antenna 1, amplifier 5 and phase shifter 9 which provides an intensity modulation signal for indicator 8 which will blank out part of the circle, the part being blanked being dependent upon the relative phases between the intensity modulation signal and the deflection signals. This phasing may be varied by adjustment of the phase shifter 9 and observing the effect upon the partially blanked indication, which for a selected adjustment of phase shifter 9 will cause the indication to revolve in one direction or the other depending upon the sense of circularity of polarization.

The apparatus of FIG. 1 can be employed at higher frequencies than 20 megacycles per second without limitation in the amplifiers 5, 6, 7 and the indicator 8 by the utilization of the superheterodyne technique wherein a single local oscillator could provide a signal for a plurality of mixers employed in place of the amplifiers 5, 6, 7 as employed in FIG. 3.

Where measurements in the microwave frequency region, typically X-band, is desired it is practical to employ waveguide apparatus such as that shown in FIG. 3 which is constructed around a trimode turnstile junction. In this apparatus, the trimode turnstile junction is combined with suitable detection and cathode ray tube indication circuitry and fed with a circular waveguide input to provide a simple microwave polarimeter which permits instantaneous viewing of input polarization. Through linear mixing, the relative amplitudes and phase relationship of orthogonal components of an arbitrarily polarized input signal are preserved in the outputs of the two mixers. After amplification, these two IF signals are applied to orthogonal deflection planes of a cathode ray tube to obtain an accurate instantaneous picture of input polarization. Circular polarization of incident energy generates a circle; elliptical polarization, an ellipse; and linear polarization, a line which may be either vertical or horizontal or any intermediate position as appropriate to indicate the plane of polarization of the energy received.

FIG. 3 includes a trimode turnstile junction 10 (indicated in detail in FIGS. 4–6) which is provided with a circular waveguide signal input section 11 together with a local oscillator 12 which is connected to the trimode turnstile junction 10 by means of a suitable line 13 typically coaxial cable or waveguide. The output arms 14 and 15 of the trimode turnstile junction 10 are connected to an amplifier 16 whereas the output arms 17 and 18 are connected to the amplifier 19. The amplifiers 16 and 19 are connected to an indicator or recorder 20 which in a typical case is a wide band cathode ray tube indicator which will respond to D.C. as well as higher frequencies.

It is important that the amplifiers 16 and 19 possess very close similarity not only in amplification and output signal amplitude over a wide band but also in phase shift characteristics.

The trimode turnstile junction 10 has disposed in each of the output arms 14, 15, 17 and 18 a mixer indicated by the numerals 21, 22, 23 and 24. Although the specific connections of the mixers are not particularly critical in that a number of different circuits can be employed to advantage, it has been found convenient to use reversed matched crystals connected in D.C. series with a simple shunt connection for single ended IF output as indicated in greater detail schematically in FIG. 7 and subsequently described in greater detail.

FIG. 4 is an overall showing of a trimode turnstile junction and the intimately associated components which were indicated schematically in FIG. 3, similar numerals corresponding to those as employed in FIG. 3. In FIG. 4 a horn 11A is connected to the circular waveguide input 11 to improve gain and directivity. Typical output coaxial connectors 15A and 18A are shown from the respective branch arms of the turnstile junction. Additionally a rectangular waveguide input connection 13 is shown to which is applied local oscillator signals obtained from the local oscillator 12. This particular waveguide as shown in an end-on waveguide to coax transition between the waveguide output of local oscillator 12 and the lower port of the trimode turnstile junction.

Interior details of a typical trimode turnstile junction employing coaxial cable local oscillator input are shown in FIGS. 5 and 6. Although these figures are described briefly here, additional details relative thereto may be found in my copending application Serial No. 629,426, filed December 19, 1956 and now Patent No. 2,892,982, dated June 30, 1959. The junction has four rectangular waveguide arms disposed in the same plane which intersect with right angular relationship. A circular waveguide 25 opens into the center or intersection portion of the rectangular waveguides on one side thereof whereas the opposite side of the waveguide intersection position contains a coaxial cable input probe and matching assembly indicated in general by the numeral 26 and shown in greater detail in FIG. 6 to which attention is now directed. Component 26 includes an outer conductor 27 and an inner conductor 28 which are relatively insulated and which may include a sleeve of insulating material 29. An extension of the inner conductor 28 forms a probe 30 extending into the intersection portion of the waveguides 14, 15, 17, 18 and 25. Improved impedance matching is provided by an adjustable assembly 31.

With regard to the operation of the apparatus of the present invention, it is convenient to recognize that an electromagnetic wave having arbitrary polarization which may be of any form, typically planar or circular, and is incident upon the horn 11A may be resolved into two components bearing right angular relationship and indicated in FIG. 5 by the numerals 32 and 33. Upon entering the junction area the component 32 will divide equally but out of phase between the arms 14 and 15 whereas component 33 will divide equally and also out of phase between the arms 17 and 18. A different situation prevails however with regard to energy from the local oscillator 12 which is introduced into the junction area through the connection 26. Such local oscillator energy will divide equally and in phase between the four rectangular arms 14, 15, 17 and 18. Thus the four mixers 21, 22, 23, 24 being equidistant from the junction, will be excited in phase by the local oscillator output while opposing mixers will be excited out of phase by the appropriate component of the signal input to the circular waveguide from horn 11A. Although it is desirable to employ balanced mixer operation as previously indicated with reversed matched crystals connected in D.C. series with the simple shunt connection to a single IF amplifier for each pair, it is also possible for desirable results to be obtained without the balanced form of mixers.

Under conditions of linear mixing, the phase and amplitude relationships of the orthogonal components 32 and 33 of the input signal to the circular waveguide will be accurately preserved in the I.F. signal outputs of the two balanced mixer pairs regardless of the frequency of the intermediate frequency chosen. Thus a local oscillator 12 will be selected to have a frequency related to the input signal applied to horn 11A to produce a desired intermediate frequency signal. The high degree of accuracy of this conversion operation, which can be achieved because of symmetry of the trimode turnstile junction and the connections to the intermediate frequency amplifiers, is most important in its application to a precision polarimeter. It is possible in such a device to obtain direct instantaneous visible indication of the polarization characteristics of an input signal. Typically for such a result the two I.F. amplified signals are applied to orthogonal deflection planes of a cathode ray tube to obtain a linear, circular or elliptical Lissajous figure which is a pictorial representation of the input signal polarization. A circularly polarized input signal will generate a circle, elliptical polarization will generate an ellipse which portrays the axial ratio and orientation of the input signal, and linear polarization will generate a line oriented to indicate the plane of polarization. This presentation as mentioned is instantaneous, the Lissajous patterns being painted at the I.F. rate.

The intermediate frequency amplifiers 16 and 19 are well-matched amplifiers, however, at present suitable duplicate amplifiers are available commercially having bandwidths greater than 10 megacycles per second, having less than 1° of phase error and identical amplification characteristics.

Figure 7:
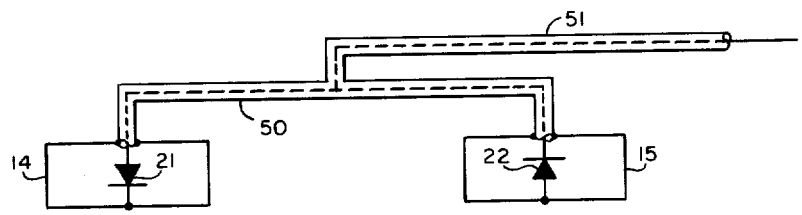
FIG. 7 shows details of the connection of mixer having reversed matched crystals connected in D.-C. series with a simple shunt connection for I.F. output.

FIG. 7 shows two opposed mixers 21 and 22 disposed in generalized indications of the waveguides 14 and 15. The mixers are polarized in opposite directions, that is one element, cathode, of mixer 21 is grounded to waveguide 14 whereas the opposing element of mixer 22 is grounded to waveguide 15. The ungrounded elements of mixers 21 and 22 are connected to the central conductor of a coaxial cable 50, the coaxial cable 50 being center tapped to provide a single output to line 51 which in turn is connected to amplifier 16.

From the foregoing it is seen that a measuring device is provided which is capable of providing an instantaneous indication of the polarization of an incoming radio wave.

Obviously many modifications and variations of the present invention are possible in the light of the above teachings. It is therefore to be understood that within the scope of the appended claims the invention may be practiced otherwise than as specifically described.

What is claimed is:

1. In combination, a trimode turnstile junction, a circular waveguide input to said junction, means for deriving a first signal in proportion to one orthogonal component of energy supplied to said junction from the circular waveguide, means for deriving a second signal in proportion to a second orthogonal component of energy supplied to said junction from the circular waveguide, means for amplifying the first and second signals, and means connected to said last named means for comparing the amplified first and second signals.

2. In combination, a trimode turnstile junction, a circular waveguide input to said junction for supplying input energy to said junction having variable polarization, first and second detector means for deriving first and second signals proportional to orthogonal components of said input energy, means amplifying the first and second signals, and means connected to said last named means for comparing the amplified first and second signals.

3. In combination, a trimode turnstile junction having four output ports and first and second input ports wherein signals from the first input port are resolved into first and second orthogonally related components at selected output ports, and signals from the second input port are obtained at the output ports, detector means connected to each output port, and cathode ray tube signal presentation means for comparing the output signals from the various output ports.

References Cited in the file of this patent

UNITED STATES PATENTS

| | | |
|---|---|---|
| 1,988,434 | Bohm | Jan. 22, 1935 |
| 2,202,400 | Roberts | May 28, 1940 |
| 2,502,394 | Smith | Mar. 28, 1950 |
| 2,533,599 | Marie | Dec. 12, 1950 |
| 2,686,901 | Dicke | Aug. 17, 1954 |

OTHER REFERENCES

IRE Proceedings, volume 16, No. 5, May 1928, (pp. 658–665 relied on.)